United States Patent [19]

Loader

[11] Patent Number: 5,074,248
[45] Date of Patent: Dec. 24, 1991

[54] PIG FARROWING AND WEANING APPARATUS

[76] Inventor: Charles S. Loader, Maranatha, Wheal Rose, Scorrier, Redruth, Cornwall, England

[21] Appl. No.: 501,482

[22] Filed: Mar. 30, 1990

[30] Foreign Application Priority Data

Apr. 4, 1989 [GB] United Kingdom ............... 8907513

[51] Int. Cl.⁵ .......................... A01K 1/00; A01K 9/00
[52] U.S. Cl. .................................. 119/20; 119/14.02; 119/74
[58] Field of Search .............. 119/72, 73, 29, 20, 119/19, 51.11, 51.01, 74, 14.01, 14.02

[56] References Cited

U.S. PATENT DOCUMENTS

| | | | |
|---|---|---|---|
| 394,955 | 12/1888 | Butler | 119/71 |
| 898,878 | 9/1908 | Grünenwald | 119/71 |
| 3,122,130 | 2/1964 | Brown et al. | 119/71 |
| 4,348,986 | 9/1982 | Marrs | 119/20 |
| 4,478,175 | 10/1984 | Fisher et al. | 119/20 |
| 4,620,505 | 11/1986 | Thomson et al. | 119/71 |
| 4,640,229 | 2/1987 | Swartzendruber | 119/51.11 |

FOREIGN PATENT DOCUMENTS

| | | | |
|---|---|---|---|
| 86169 | 9/1958 | Denmark | 119/20 |
| 2533111 | 3/1984 | France | 119/14.01 |
| 134933 | 6/1959 | U.S.S.R. | 119/14.02 |
| 2026832 | 2/1980 | United Kingdom | 119/20 |

Primary Examiner—John G. Weiss
Attorney, Agent, or Firm—Banner, Birch, McKie & Beckett

[57] ABSTRACT

Pig farrowing apparatus comprises a restraining crate for a sow, a delivery chamber having a grid floor separated from the sow by a hinged door or flap, a piglet rearing chamber communicating with the delivery chamber and joined thereto by a ramp, and piglet feeding apparatus for delivering feed to piglets contained in the piglet rearing chamber and comprising milk extracted from the mother or another sow and/or artificially produced feed product.

9 Claims, 4 Drawing Sheets

PIG FARROWING AND WEANING APPARATUS

BACKGROUND OF THE INVENTION

Intensively bred pigs are very prone to disease which affects their growth rate and consequently the profits available from a pigrearing establishment. One important factor in the propensity of piglets to suffer from disease is the stress factor. Immediately after birth piglets are highly stressed and lose temperature rapidly in traditional conditions. Consequently, piglets under shock are extremely prone to disorders of the bodily functions especially the lungs. This is particularly noticeable at birth since the animals lungs are undergoing a major change at birth from being rudimentary organs fed from the blood supply in the placenta to independent organs constituting the primary oxygenation source for the blood. Lung infections such as pleurisy and pneumonia lead to a high mortality rate which matches that from crushing. British Pat. No 2,121,665 describes apparatus for confining a sow during farrowing, comprising a pen in the form of an elongate open framework of bars the spacing of which is such as to contain a sow and prevent her from turning around, and a piglet confinement chamber at one end of the framework, the said framework incorporating a frame panel on a major side thereof, which panel can be opened to allow the sow to turn around.

The term "sow" as used in this specification will be understood to include all female pigs capable of producing a litter of piglets, and including the so-called "gilts" namely partly mature female pigs prior to the delivery of the first litter.

OBJECTS OF THE INVENTION

A primary object of the present invention is to provide an improvement over known farrowing apparatus.

Another object of the present invention is to separate piglets from the mother sow for their own safety whilst nevertheless allowing them to benefit from the colostrum in the mother's milk and the reassuring warmth and noise associated with the natural environment. Pig farrowing apparatus of the present invention constitutes an additional development over that disclosed in the earlier British Patent referred to above, in particular to maintain separation between the piglets and the sow in order to ensure that the piglets are not crushed by the sow as very often happens in more "natural" conditions whilst nevertheless enjoying the benefits of warmth and proximity to the mother animal.

SUMMARY OF THE INVENTION

According to one aspect of the present invention, therefore, pig farrowing apparatus of the type having means for restricting the orientation of a sow during delivery and a farrowing chamber separated from the sow by a closable opening, is further provided with at least an entrance portion of the farrowing chamber having a grid floor serving to prevent excessive piglet movement upon arrival thereby to limit umbilical cord damage.

In a preferred embodiment of the invention the delivery chamber is linked to an adjacent chamber alongside the sow restraining apparatus, joined to the delivery chamber by an inclined ramp. Piglets in the natural state instinctively move from the end of the sow from which they are delivered during parturition to the region between the sow's front and rear legs to suckle. The apparatus of the present invention makes use of this instinctive behaviour to encourage the piglets to move from the delivery chamber maintained at a temperature matching that of the body heat of the sow, to a further chamber maintained still at a super ambient temperature, slightly lower than that in the delivery chamber, where amplified sounds from the sow are reproduced and in which a supply of milk incorporating the sow's own colostrum is delivered.

The present invention also provides a method of farrowing a sow and rearing piglets comprising the steps of separating the sow from the piglets physically at parturition, milking the sow at least during the period for which colostrum is produced, and delivering the colostrum-bearing milk to piglet feeding apparatus. It is important that the piglets must not make contact with the sow in order to encourage them to learn to feed from the incubator feeder. However, a piglet's instinctive reaction is to commence suckling when they receive stimulii from the sow herself and consequently the close proximity of the sow in an adjacent chamber and the sounds produced by her act to stimulate the piglets to drink. Sows, like cattle, release milk consciously to the teats from the mammary glands and in doing so emit a characteristic series of grunts which are recognized by the piglets as a signal indicating that milk is available. Any attempt at suckling at other times results in rejection by the sow and failure to satisfy the piglet's hunger and such behaviour is quickly "unlearned". In this way the sow naturally regulates the intake of feed and the apparatus of the present invention seeks to simulate this natural cyclic arrival of food at milk feeders within the incubation chamber, which becomes available to the piglets at periodic intervals. It is expected that the piglets will be confined in the incubation chamber for a period of up to three weeks until they naturally start taking solid food which can be made available in a creep feeder to which they have access and from which the mother sow is barred.

Preferably the delivery chamber is removable to allow the sow to leave the farrowing crate after farrowing has been completed. Alternatively a farrowing crate having a laterally displaceable side panel may be used as described in UK Patent 2,121,665.

After the production of colostrum has ceased the milk may be delivered to the piglet feeding apparatus as a milk solution made from dehydrated milk powder. Any surplus colostrum-bearing milk may be stored at low temperature for emergency use if any sow in the establishment fails to produce colostrum.

Other features and advantages of the present invention will become apparent from a study of the following detailed description, in which reference is made to the accompanying drawings provided purely by way of non-limitative example only.

DESCRIPTION OF THE PREFERRED EMBODIMENT

Figure 1:
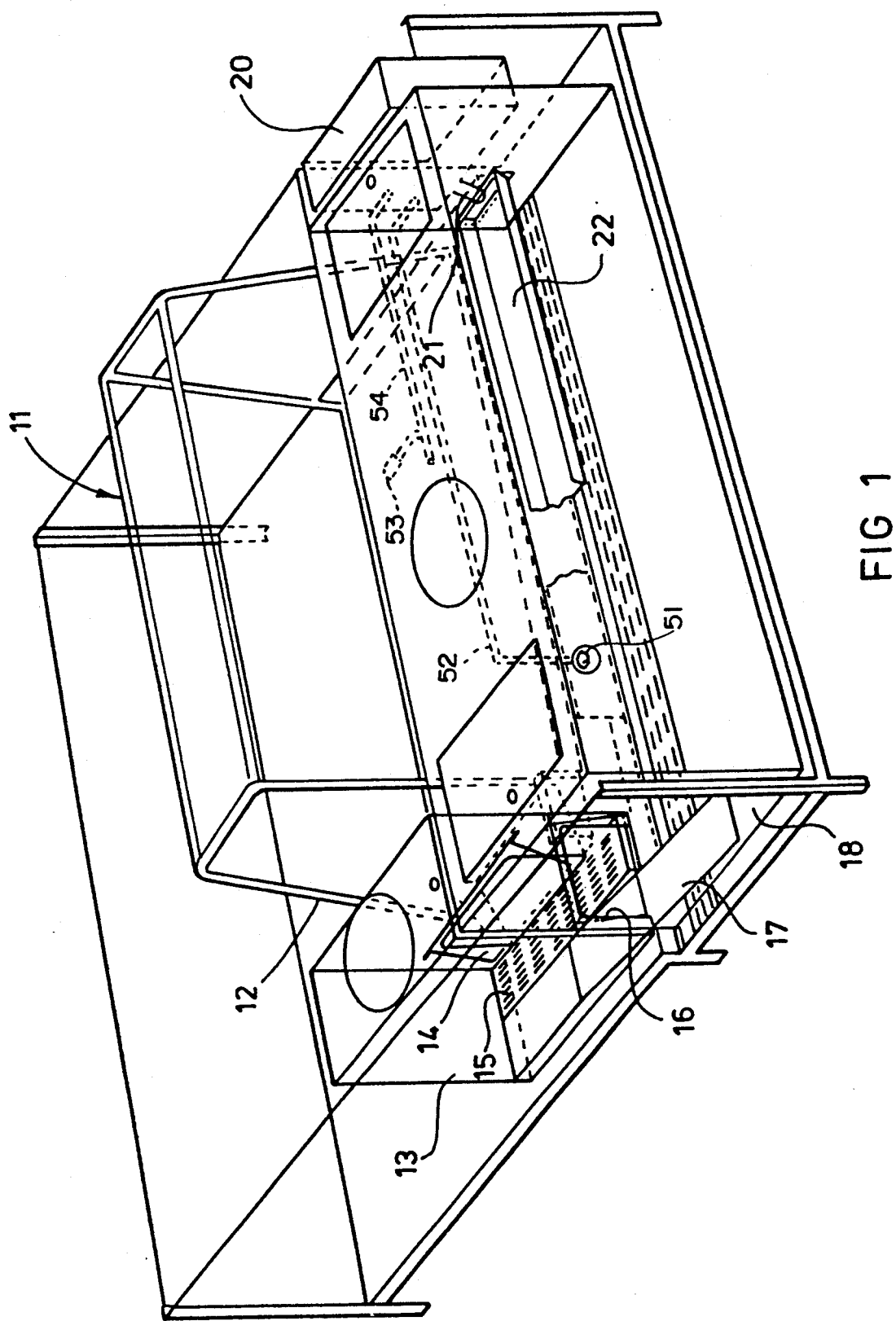
FIG. 1 is a perspective view of a pig-farrowing unit incorporating a delivery chamber and a lateral incubator.

Referring first to FIG. 1 the apparatus shown comprises a farrowing crate generally indicated 11 which may be a conventional end-loading crate or a side loading crate as described in UK Patent 2,121,665. The farrowing crate is shown only schematically in outline in FIG. 1. At one end 12 of the farrowing crate 11 is located a delivery chamber 13 through which access is gained via a flap 14 which acts as a unidirectional barrier allowing piglets to be delivered from a sow in the farrowing crate 11 (with head to the right-hand end as seen in FIG. 1) through the door 14, which door will remain closed against the escape of piglets from the delivery chamber 13. Adjacent the door 14 is a grid floor 15 which allows for drainage of any residual body fluids on the piglets and also serves to prevent them from sliding too rapidly beyond the door 14 so as to avoid damage to the umbilical cord which is naturally severed after a short time.

The delivery chamber 13 has an exit opening 16 leading by a ramp 17 to a pre-weaning or incubation chamber 18 which extends along the whole of the side of the farrowing crate 11. At the end of the incubation chamber 18 remote from the inlet end there is located feeding apparatus 20 which will be described in more detail below, delivering milk through an outlet 21 to a trough 22. In other embodiments the trough 22 may be replaced by an array of teats from which the milk delivered from the feeding apparatus 20 may be drawn by suckling. One such teat is shown at 51 in FIG. 1 and is connected to the feeding apparatus 20 through a line 52. Milk may also be taken from the sow in the farrowing crate 11 via milking cups (only one shown at 53) which can be fitted on to the sow's teats. From the cups 53 the milk is drawn through a line 54 to the apparatus 20 which supplies it to the teats 51.

The apparatus of the present invention thus constitutes a farrowing/incubator unit having a movement restrictor grid at the inlet to the piglet delivery chamber to prevent excessive movement upon arrival through a first opening from a farrowing crate, a second unidirectional door with an associated second ramp leading to an incubator area separate from the farrowing chamber. The opening 16 is thus preferably provided with a unidirectional flap or door which prevents the return movement of any piglet from the incubation chamber 18 back to the delivery chamber 13. This door may be dispensed with if it is found that the ramp 17 is too steep to be climbed by a piglet, or may be replaced with a sliding door which can be left open whilst farrowing is actually taking place and can be closed by the operator after all the piglets have left the delivery chamber 13 to hold them in the incubation chamber 18. The incubation chamber 18, the farrowing crate 12, and the delivery chamber 13 may all have a grid floor.

Figure 2:
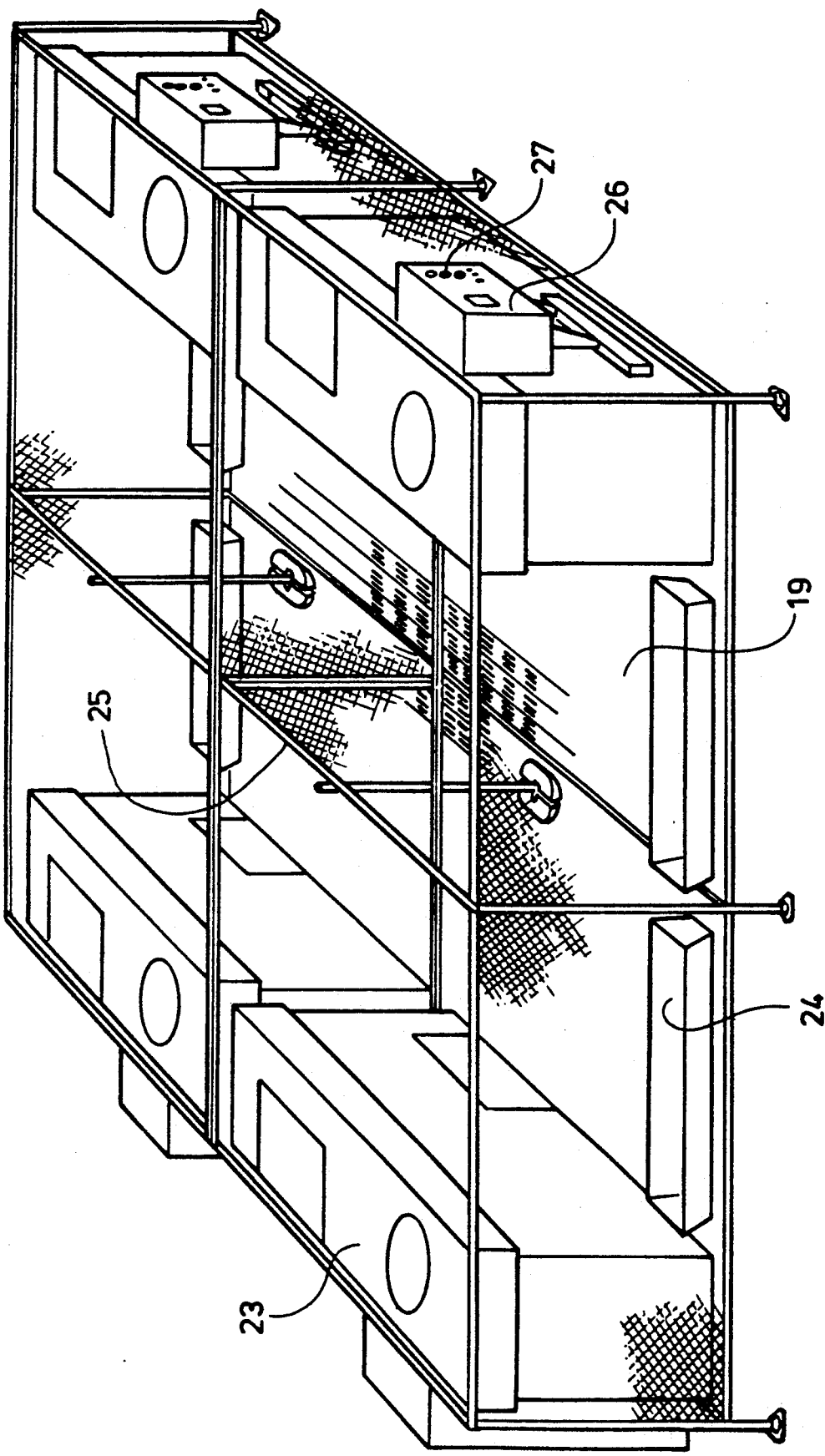
FIG. 2 is a perspective view of a piglet holding chamber to which the piglets may be subsequently moved after leaving the incubator.

After the initial incubation period during which the piglets are fed on milk, usually lasting about three weeks, they are transferred to the weaning apparatus illustrated in FIG. 2, comprising a raised bed 19, which may also be a grid floor, defining open enclosures having sets of houses 23 along the outer sides, creep feed containers 24 at each end and separating barriers 25 by which different litters may be divided. In addition to separating different litters the barriers 25 may be used to define enclosures for piglets making different rates of progress. Timed feeding apparatus 26 on the side wall of the houses may provide additional milk or other nutrients at timed intervals which can be determined by operating the controls 27.

Figure 3:
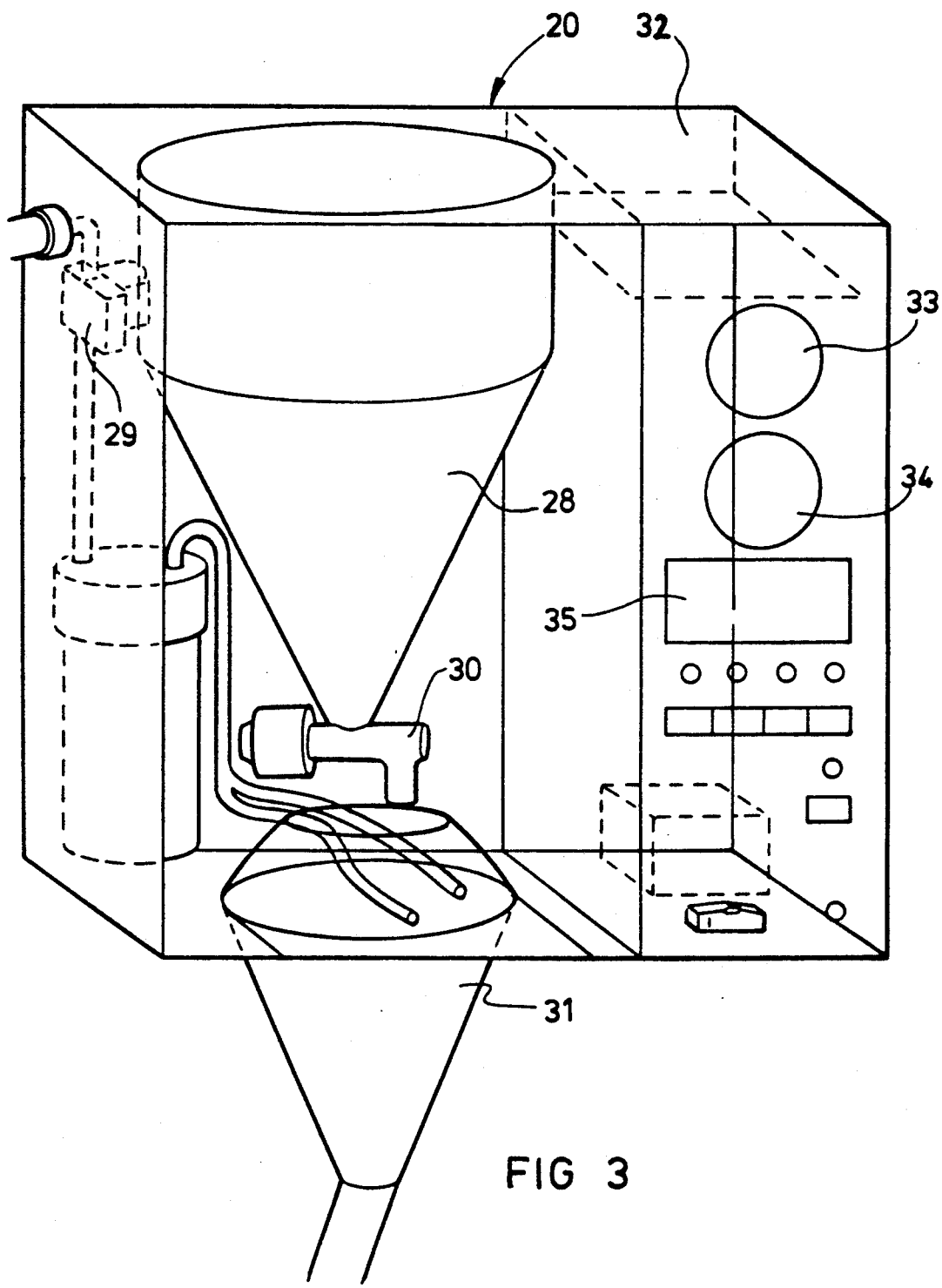
FIG. 3 is a perspective view of a part of a piglet feeder.

The integrated feeding system for delivering milk to the feed trough 22 in the incubation chamber is illustrated in more detail in FIG. 3. The feeder 20 has a cyclone drum 28 tangentially into which can be fed liquid from a pump 29 to generate a vortex for thorough mixing of milk powder or other powdered nutrients which can be introduced through the top. A delivery pump 30 leads to a hopper 31 from which the mixed feed is dispensed.

The whole feed unit is controlled by a dedicated microprocessor 32 and includes a twenty-four hour clock 33, a duration timer 34 by which the intervals between feeds and the length of time for which feed is dispensed, and therefore metered, can be controlled. In addition, an audio-stimulator 35 which acts to reproduce or generate sounds corresponding to the stimulating grunts which a sow emits when releasing milk to the teats to provide an indication to the piglet.

In an alternative, fully automatic system, a feed hopper for dry powder capable of holding up to one week's supply of powder may also be provided with means for automatically mixing this at the appropriate times for dispensing to the piglets. In addition to the feed supply, of course, the feed system 20 may also introduce prophylactic drugs, growth hormones or other drugs for stimulating growth and maintaining health in the piglets. This allows very high rate multiple births to be raised to maturity successfully without any need for inductions at birth due to the safe controlled conditions for delivery to the delivery chamber 13, the maintenance of piglet temperature both in the delivery chamber 13 and the incubation chamber 18, and the safe way in which the colostrum is fed to the piglets simultaneously with the sow noises and, at the early stages, also the sow's physical presence.

Figure 4:
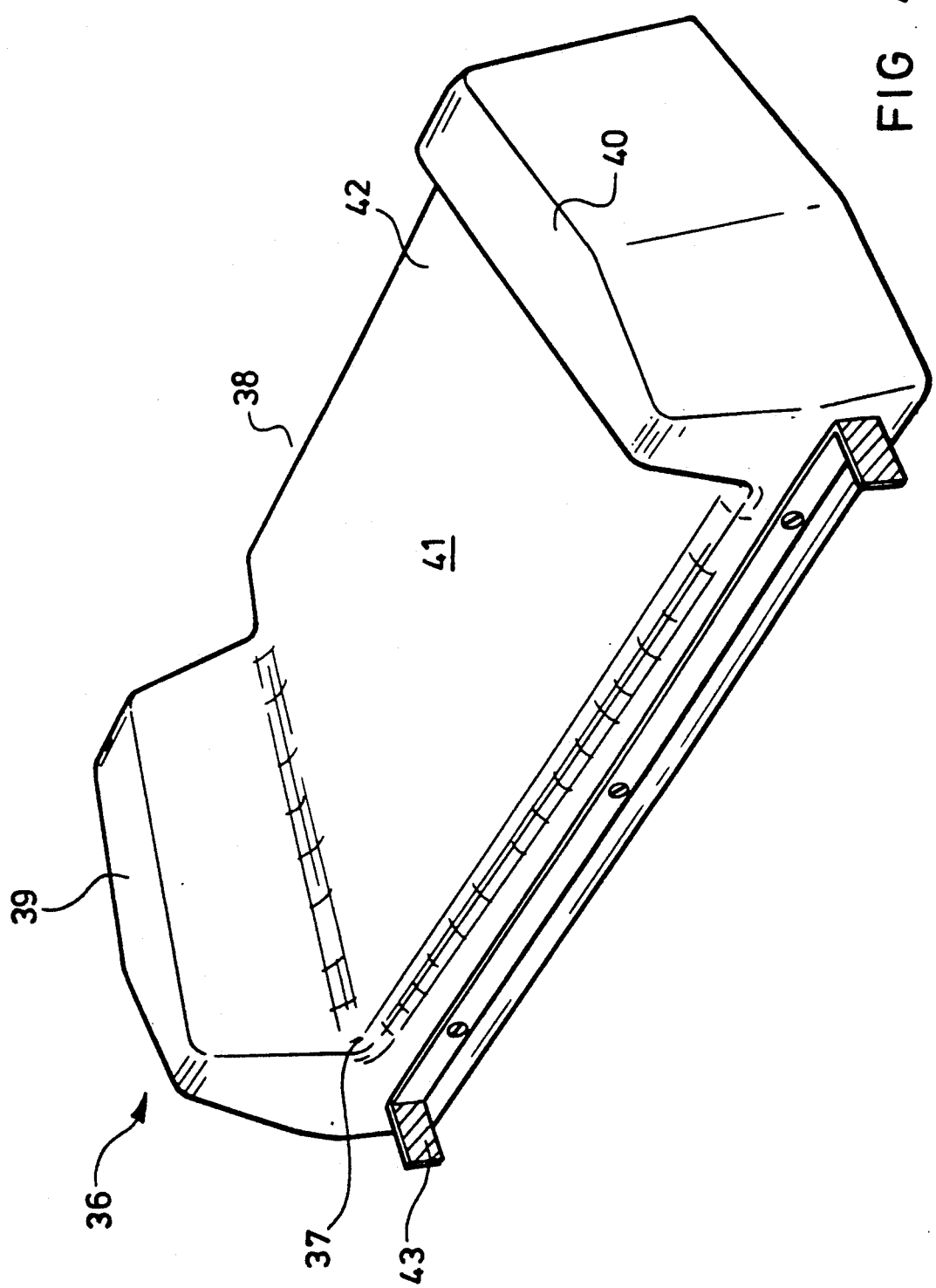
FIG. 4 is a perspective view of a floor unit for a piglet delivery chamber.

FIG. 4 illustrates a novel smoothly rounded inclined surface forming the rear section of the sow's farrowing crate leading to the exit door 14. The ramp is generally indicated with the reference numeral 36 and has an upper entrance end 37 and an exit end 38. The sides of the exit ramp are defined by upper shoulders 39, 40 smoothly joined, for example by plastics moulding, to the main inclined surface 41 leading from the entrance end 37 to the exit end 38. At the exit end 38 the surface 41 has a projecting lip 42 which can extend through the opening closed by the exit door 14. A bracket 43 is provided for securing the exit ramp to the floor of the farrowing crate 11.

In use of the apparatus of the present invention a sow to be farrowed is introduced into the farrowing crate 11 with her rear end at the end 12 adjacent the delivery chamber 13. When farrowing the sow has a natural tendency to push her rear towards a secure surface such as a wall and in doing this will raise her rump onto the entrance end 37 of the exit ramp 36. Piglets when delivered will then tend to slide down the ramp 41 through the unidirectional flap or door 14 across the grid 15 into the delivery chamber 13. As mentioned above the grid 15 slows the progress of a new born piglet to avoid damage to the umbilical cord, allow for drainage of excess body fluid and generally slow the piglet's movements so that it remains in the delivery chamber for a short while before its natural movements, nosing instinctively around the sow towards the teats, will cause it to pass through the opening 16 and down the ramp 17 into the incubation chamber where ultimately it will start feeding from the trough 22 or teats which may be provided in its place.

I claim:

1. In a pig farrowing apparatus of the type having:
   restraining means for restricting the orientation of a sow during delivery, and
   a delivery chamber separated from said restraining means by a closable opening,
   the improvement comprising:
      door means closing said opening, said door means being openable to allow a piglet into said delivery chamber,
      means closing said door to prevent the return of said piglet to said restraining means;
      a substantially horizontal grid floor in said delivery chamber serving to prevent excessive piglet movement upon entry therein so as to limit umbilical cord damage and to provide drainage of residual body fluids;
      a feeder chamber alongside but separated from said sow restraining means;
      linkway means linking said delivery chamber to said feeder chamber, said linkway means including a ramp inclined downwardly to said feeder chamber, said linkway means being adapted to allow a piglet to move from said delivery chamber to said feeder chamber but to prevent its return into said delivery chamber; and
      feeder means in said feeder chamber for making available feed to piglets therein.

2. The pig farrowing apparatus of claim 1, wherein there are further provided means for reproducing or generating the noises made by a sow during suckling.

3. The pig farrowing apparatus of claim 1, wherein there are further provided means for drawing milk from a sow and means for transferring it to liquid feed dispensing means in said feeder chamber.

4. The pig farrowing apparatus of claim 1, wherein said feeder means have a feed outlet and include a milk powder dispenser,
   means for mixing the powder with a liquid, and
   means for delivering the mixed feed to said feed outlet.

5. The pig farrowing apparatus of claim 4, wherein said feed outlet comprises at least one teat for suckling by piglets in said chamber.

6. The pig farrowing apparatus of claim 4, wherein said dispensing outlet includes a nozzle for delivery of prepared animal feed to a trough.

7. The pig farrowing apparatus of claim 1, wherein a plurality of apertures are formed in the floor of at least one of said farrowing chamber, said delivery chamber and said feeder chamber whereby to permit drainage therefrom.

8. A method of farrowing a sow and rearing piglets, comprising the steps of:
   separating the piglets from the sow physically at parturition and confining them in a chamber alongside the sow where they can receive natural stimulation from the sow but are not physically endangered thereby;
   milking said sow at least during a preliminary period during which colostrum is produced to obtain colostrum-bearing milk, and;
   delivering said colostrum-bearing milk to piglet feeding apparatus for feeding said piglets in said chamber.

9. The method of claim 8, further including the step of producing noises reproducing or simulating the sound made by a sow during suckling.

* * * * *